United States Patent

[11] 3,631,763

[72] Inventor Kenneth Court
Detroit, Mich.
[21] Appl. No. 173
[22] Filed Jan. 2, 1970
[45] Patented Jan. 4, 1972
[73] Assignee Sperry Rand Corporation
Troy, Mich.

[54] POWER TRANSMISSION
8 Claims, 14 Drawing Figs.
[52] U.S. Cl. ........................................... 91/506,
91/507, 92/12.2
[51] Int. Cl. ........................................... F01b 13/04,
F04b 1/20
[50] Field of Search ........................................... 91/375,
499, 504–507; 92/12.2

[56] References Cited
UNITED STATES PATENTS
| | | | |
|---|---|---|---|
| 3,026,854 | 3/1962 | Wiedmann et al. | 91/375 |
| 3,299,829 | 1/1967 | Jackson | 92/13.1 |
| 3,332,323 | 7/1967 | Roeske | 92/13.1 |
| 3,406,608 | 10/1968 | Diedrich | 91/506 |
| 3,513,879 | 5/1970 | Adams | 91/375 |

*Primary Examiner*—William L. Freeh
*Attorney*—Van Meter and George

ABSTRACT: A variable displacement fluid pump or motor has an oscillatable displacement-controlling member. A servomotor positions the member under the control of a rotary servo valve on the axis of oscillation. The porting in the valve provides for greater than 90° travel of its input member while maintaining substantial hydraulic balance upon the movable valve members.

INVENTOR.
KENNETH COURT

INVENTOR.
KENNETH COURT

BY

ATTORNEYS

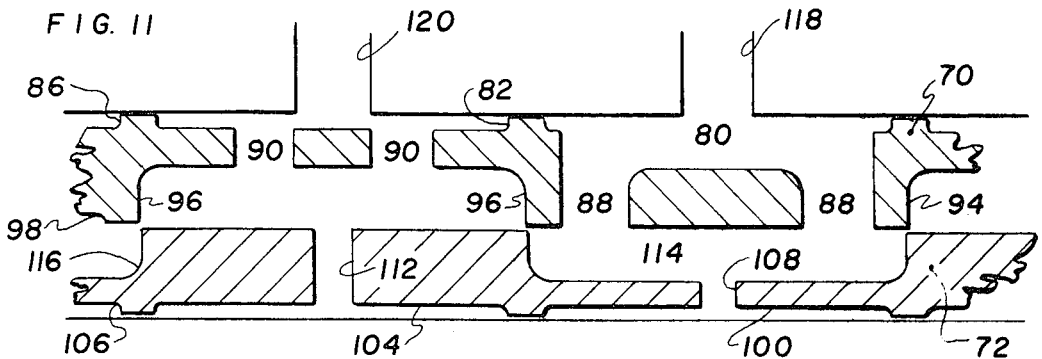
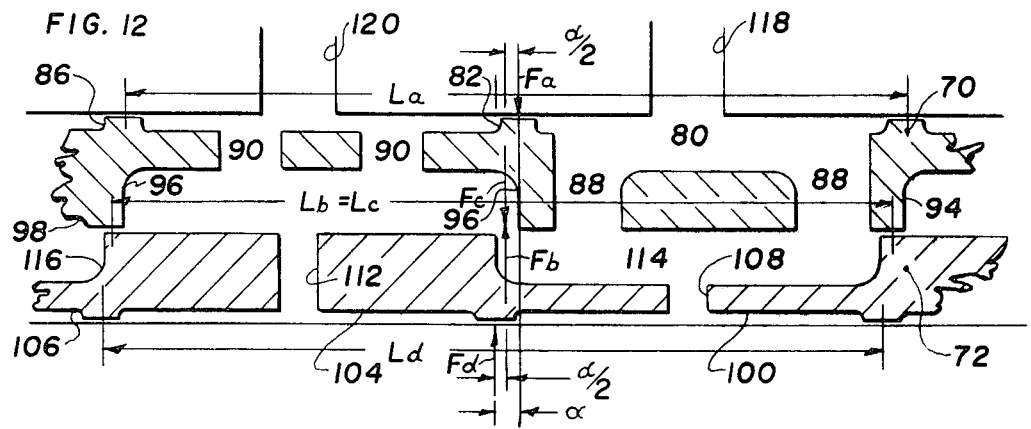
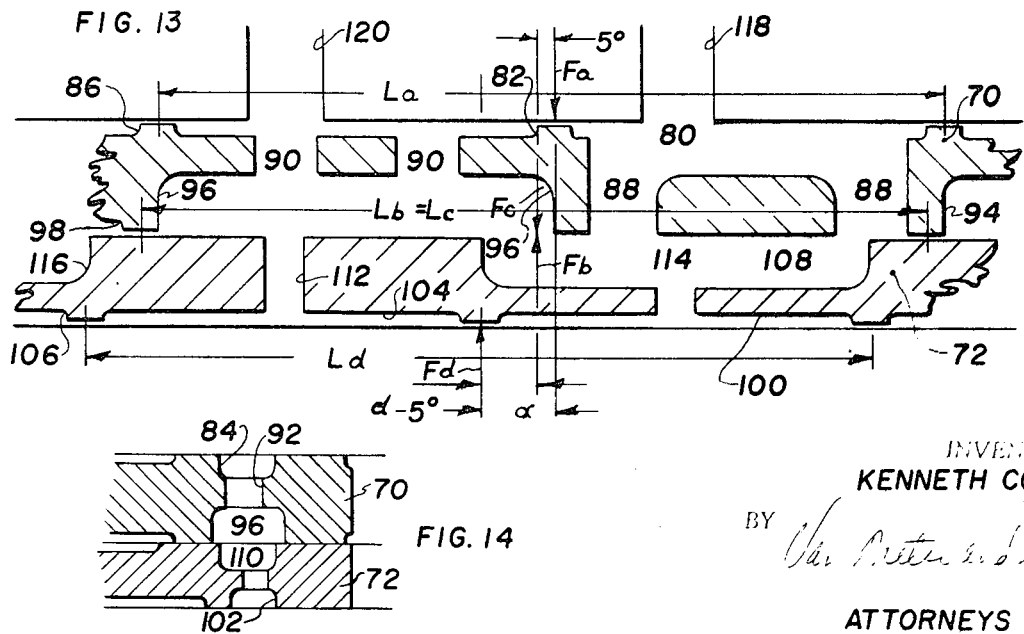

POWER TRANSMISSION

The provision of servomotor control for the swashplate of a variable stroke pump or motor customarily utilizes a followup valve within a rectilinear fluid motor connected to the swash plate. The construction requires complex mechanical connections and substantial space outside that normally required by the pump or motor unit itself.

The present invention aims to provide a followup servo valve which can be incorporated in the housing of the variable displacement unit and which can utilize the angular movement of the swashplate directly upon the feedback member of the rotary servo valve.

A further object of the invention is to provide in a rotary servo valve of this type, hydraulic balancing areas which are so located upon the valve members so that the valve may be operated with a minimum of torque.

It is another object of the invention to provide a servo valve of this type in which substantial overtravel of the input member may be permitted without disturbance of its normal function and thus enable simple control linkages to be utilized when more than one variable displacement unit is being controlled from a common input linkage.

The invention embraces a pair of oscillatable plates in face-to-face engagement; one being connected directly to the swashplate or other oscillatable member, and the other being shiftable as the primary controlling device or input member. A set of four arcuate ports are provided on the abutting faces of the two plates and are so angularly arranged that substantial overtravel of the input member may take place. Two of the ports occupy more than 90° of arc, while another port is of short arcuate extent. The backfaces of both plates are provided with balancing recesses so shaped and positioned as to substantially counteract the forces acting on the abutting faces, not only in the centered position of the valve plates but also in positions of great angular displacement.

In the drawings:

FIGS. 11, 12 and 13 are diagrammatic views on an exaggerated scale showing the porting of the valving in different relative positions of the two plates.

FIG. 14 is a diagrammatic radial section of the valving.

Figure 1:
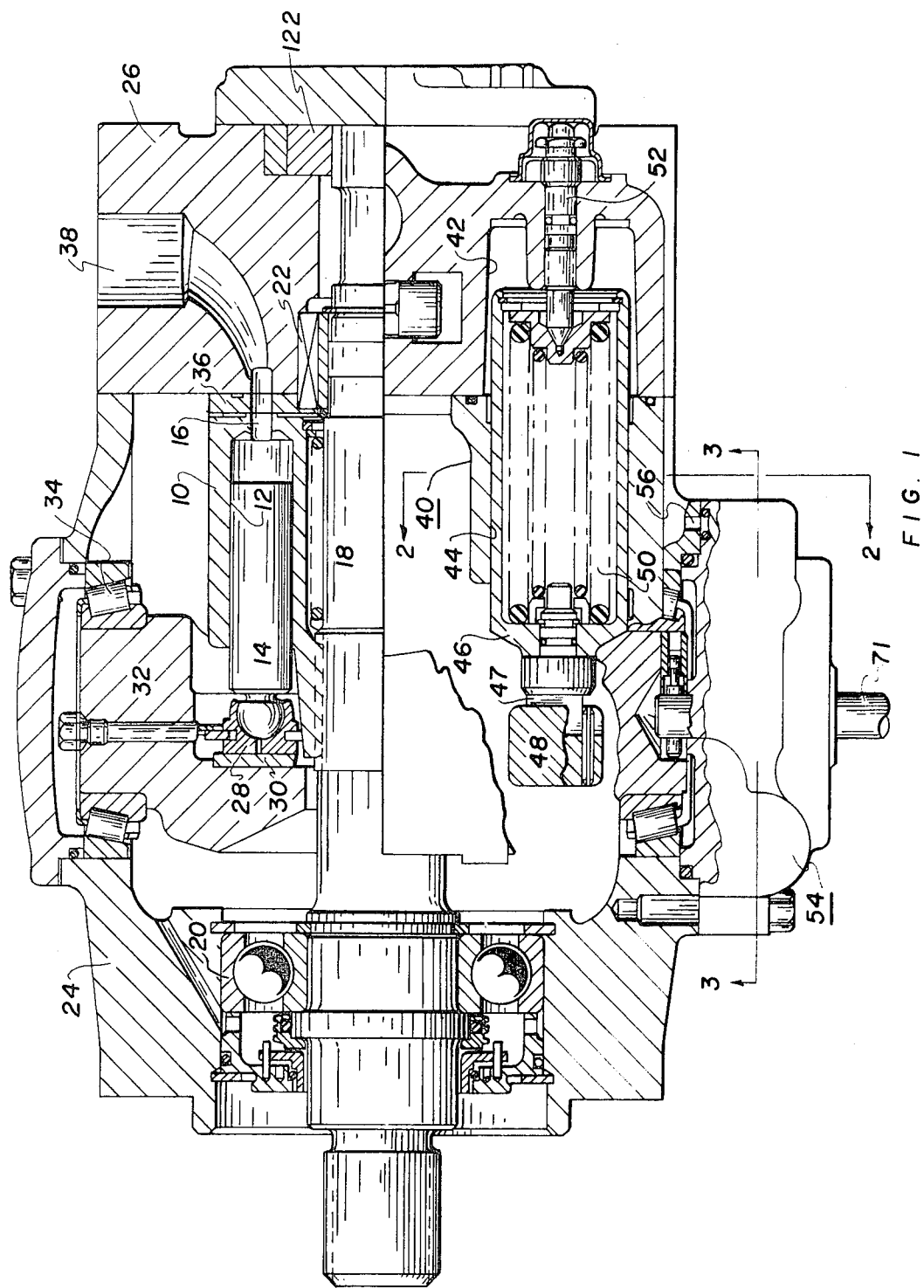
FIG. 1 is a longitudinal cross section taken partly on line 1—1 and partly on line 1–1a of FIG. 2 illustrating a preferred form of the present invention.
Figure 2:
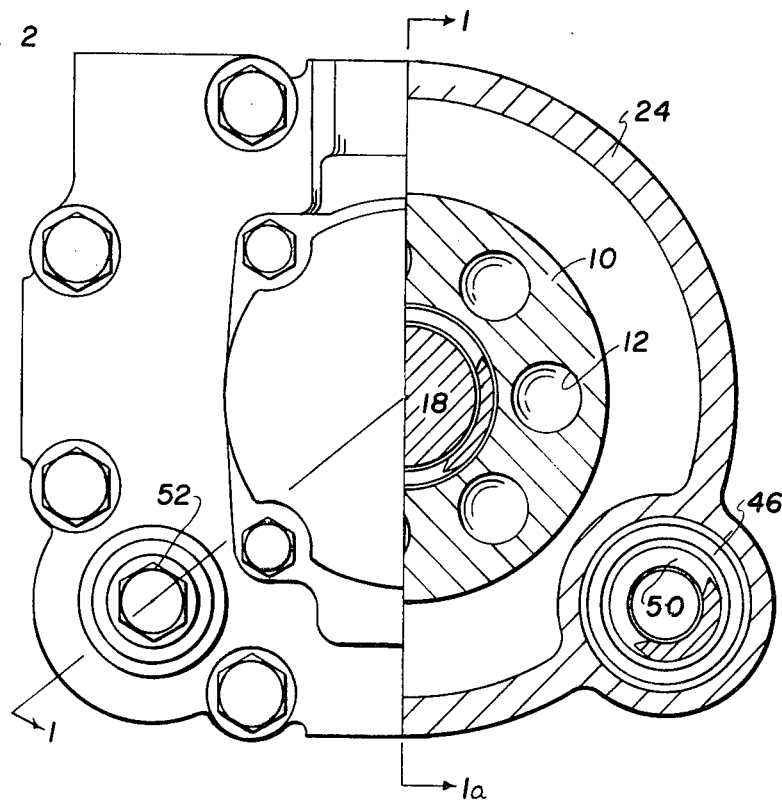
FIG. 2 is an end view, partly in section on line 2—2, of the device illustrated in FIG. 1.

The invention is illustrated as applied to a variable stroke axial piston pump or motor. One type of such fluid pressure energy translating device commonly employs a rotary cylinder barrel 10 having a plurality of bores 12 in which pistons 14 reciprocate to alternately ingest and expel liquid through ports 16 in the end face of the barrel 10. A drive shaft 18 is journaled on bearings 20 and 22 in a housing consisting of a main case 24 and an end closure 26 bolted thereto. The pistons 14 have ball-jointed shoes 28 slidable on a swashplate 30 carried by a cup-shaped yoke 32. The yoke 32 is oscillatable in bearings 34 mounted in the casing 24 for the purpose of controlling the stroke of the pistons 14 as the cylinder barrel 10 is rotated. A flat valve plate 36 is mounted on the inner face of the end member 26 and commutates the flow of liquid into and out of the cylinder ports 16 with respect to the supply and delivery passages, one of which is represented at 38, and which form fluid terminals for the device. The construction is typical of the many forms of variable displacement units with which the present invention may be utilized.

For the purpose of controlling the angular position of yoke 32, there are provided a pair of similar servomotors, generally designated 40. Each motor includes a blind, rough bore 42 in the end member 26 and a finished, through bore 44 in the main casing member 24. A piston 46 is in abutment with a roller 47 mounted in an arm 48 of the yoke 32 (on one or the other side of the axis of oscillation) and slidably fits the bore 44. A preloaded centering spring assembly 50 is contained within the piston 46 for urging it toward the left in FIG. 1 and may be adjusted through the means of an adjusting screw 52 from the outside of the casing. Fluid passageways, not shown, lead from the bores 42 through the case 24 to a servo valve assembly, generally designated 54. A part of one such passage is indicated at 56 in FIGS. 1 and 4.

Figure 3:
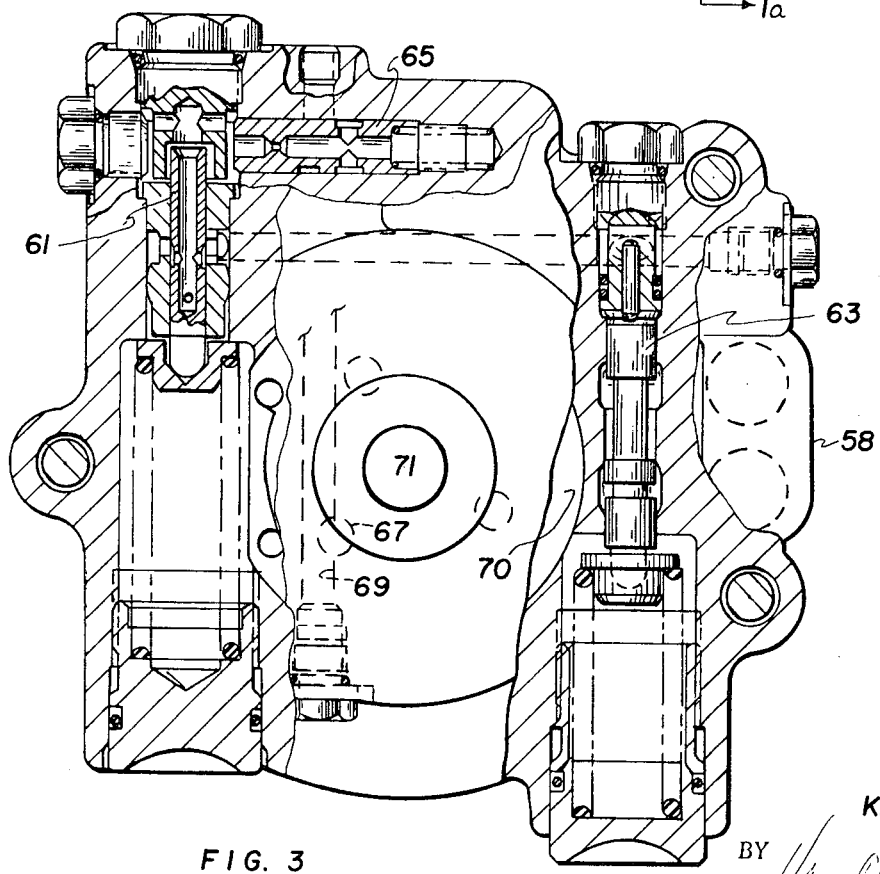
FIG. 3 is a fragmentary enlarged sectional view taken on line 3—3 of FIG. 1.
Figure 4:
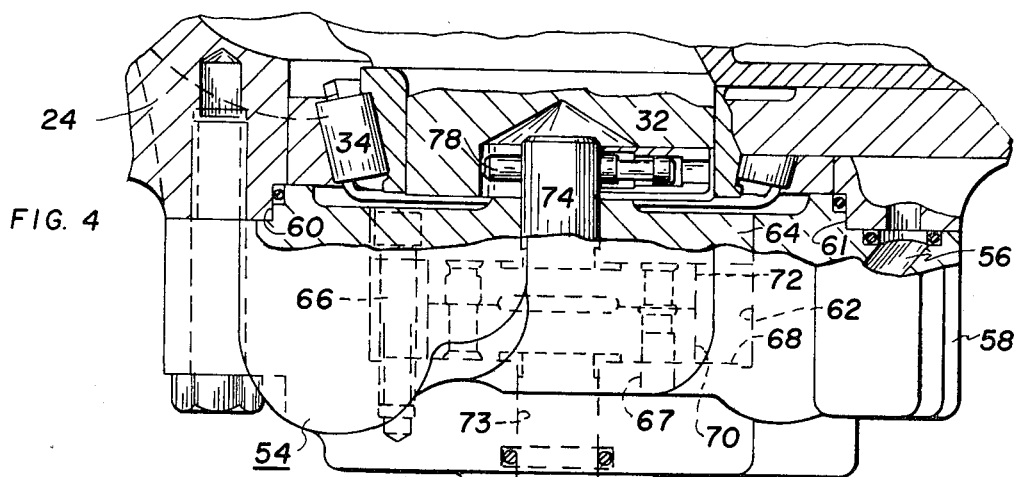
FIG. 4 is an enlarged fragmentary view, partly in section, corresponding to a portion of FIG. 1.

The servo valve assembly 54 is illustrated on a larger scale in FIG. 4 and comprises a main body member 58 bolted to the case 24 adjacent to one of the trunnion bearings 34 of the yoke 32. The body 58 has a pilot extension 60 which fits in a counterbore 61 in the case 24. The body 58 has a cylindrical recess 62 which is closed by an inner cap member 64 secured to the body 58 by bolts 66. Thus, the recess 62 closed by the cap 64 provides a chamber to receive two rotary valve plates which are illustrated in FIGS. 5 through 10. Suitable supply and exhaust passages for servo fluid, similar to the passage 56, are provided in the casing 24 and the body 58, terminating in suitable ports in the bottom face 68 of the recess 62, such as shown at 67 and at 69 in FIG. 3.

The body 58 may also incorporate any pressure or flow control valves which may be needed for controlling the supply of servo fluid from the source. These are indicated at 61, 63 and 65 in FIG. 3.

A rotary input valve member 70 has a stem or operating shaft 71 which extends through a bore 73 in the body 58 and forms the input member whereby the displacement of the entire device may be controlled. This may be connected either directly or through suitable linkages to a manual or automatic controlling device. A second rotary plate valve 72 is mounted adjacent the plate valve 70 and against the cap 64. Its stem 74 is journaled in the cap 64 and has a hole 76 and a pin 78 to form a driving connection with the yoke 32. The bottom face of the plate 70 in FIG. 4 and the top face of the plate 72, which will hereinafter be termed backfaces, are provided with suitable arcuate recesses and ports about to be described. Likewise, the abutting faces, hereinafter termed the valving faces, of the plates 70 and 72 are provided with arcuate ports whereby the fluid flow to and from the servomotors 40 may be controlled.

Figures 5, 6, 7:
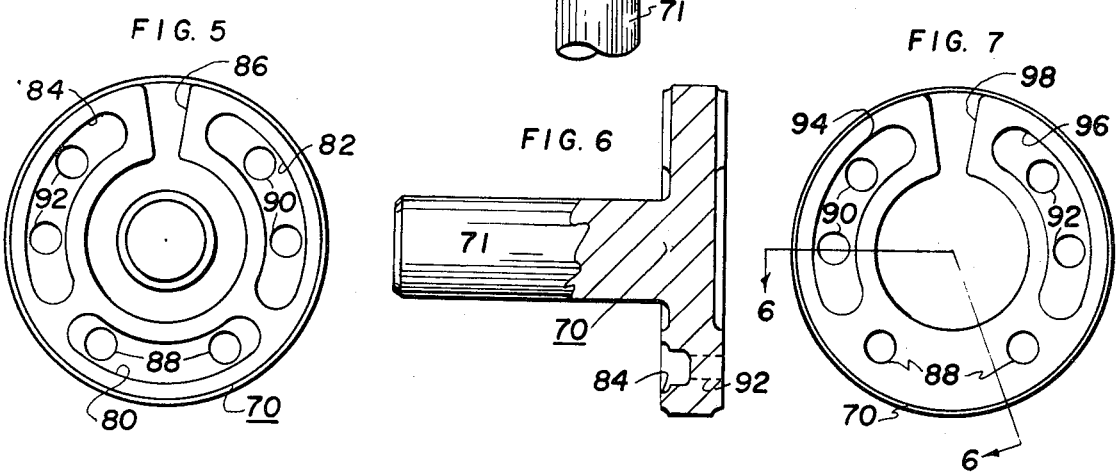
FIG. 5 is a view of the backface of the input valve plate.
FIG. 6 is a sectional view taken on line 6—6 of FIG. 7.
FIG. 7 is a view of the front face of the input valve plate.

Referring now to the rotary input valve 70 illustrated in FIGS. 5, 6 and 7, the backface thereof, shown in FIG. 5, is recessed to provide three fluid connections; these are the pressure recess 80 and the two motor recesses 82 and 84. A drain recess 86, which is a mere slot leading to the interior of the casing 24 through a suitable passage, not shown, extends through the plate 64. The recesses 80, 82 and 84 register, throughout the allowable angular motion of the valve plate 70, with the appropriate passages such as 67 in the bottom of recess 62 in the body member 58. Through holes such as 88, 90 and 92, connect with the valving face of the plate 70. As shown in FIG. 7, this face has recesses 94 and 96 reflecting approximately the configuration and size of the recesses 82 and 84 respectively. A recess 98 reflects the configuration of recess 86. By limiting the arc subtended by the fluid return recess 86 to a small arc, the motor recesses 82, 84, 94 and 96 may subtend arcs which are substantially greater than 90°.

Figures 8, 9, 10:
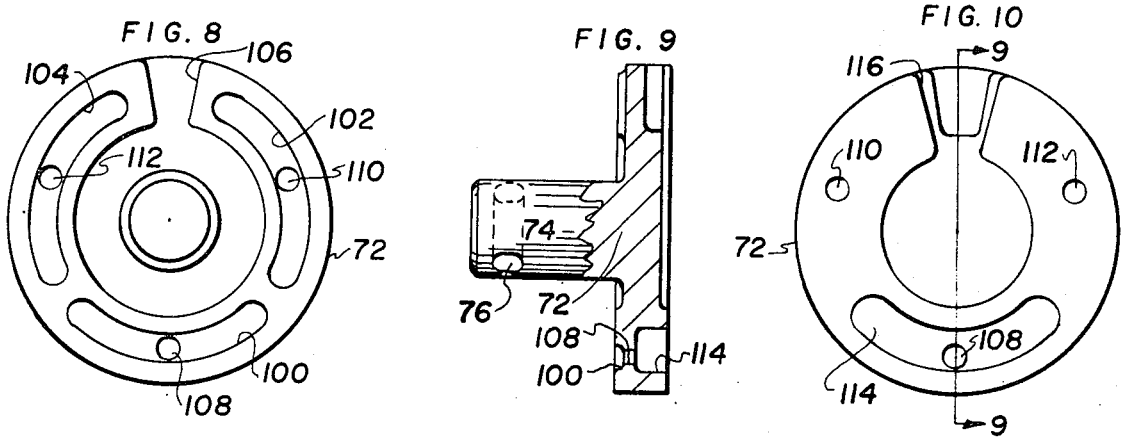
FIG. 8 is a view of the backface of the feedback valve plate.
FIG. 9 is a sectional view taken on line 9—9 of FIG. 10.
FIG. 10 is a view of the backface of the feedback valve plate.

The feedback valve plate 72 shown in FIGS. 8, 9, and 10, is provided on its backface with four recesses 100, 102, 104 and 106 which reflect approximately the configurations of the recesses 80, 82, 84 and 86 of the valve 70. Holes 108, 110 and 112 extend through to the valving face where hole 108 connects with a recess 114 corresponding in configuration to the recess 80 on valve plate 70. A tank return recess 116 has a configuration corresponding approximately to that of recess 86 and provides a flow path for exhaust fluid to the interior of casing 24, through a suitable passage, not shown, extending through plate 64.

Referring again now to FIG. 1, the purpose of the rotary plate valve assembly 54 is to control the flow of servo fluid to each of the two servomotors 40 in a manner to cause the angle of the yoke 32 to take up any angular position assumed by the stem 71 of the input valve plate. A rotary gear pump 122 on the right-hand end of shaft 18, or other source of pilot pressure, is connected by internal bores, not illustrated, with passages such as 56, 67 and 69 leading to the valve 54.

In operation of the pump, rotation of the shaft 18 carries with it the cylinder barrel 10 and the pistons 14, the shoes 28 of which slide upon the surface of the swashplate 30 mounted in the tiltable yoke 32. The stroke of the pistons 40 is determined by the extent and the direction in which the yoke 32 is tilted under the action of the servomotors 40. Thus, fluid will be delivered either into or out of the port 38 in proportion to this tilt, and out of and into the corresponding opposite port. Pump 122 will deliver servo fluid to the servo valve 54.

The centering spring assemblies 50 of each of the servomotors 40 may be adjusted through the adjusting screws 52 so that when both motors 40 are unpressurized, the centering springs will hold the yoke 32 parallel to the surface of the valve plate 36 and thus the stroke of the pistons 14 will be zero. A centered condition of the rotary valve members 70 and 72 which will accomplish this is illustrated in FIG. 11. This Figure represents an unwrapped cylindrical section of approximately one-half of the valve, both members being in centered position. Passage 118 indicates the servo fluid supply and passage 120 indicates one of the passages leading to a servomotor 40. In this position, pressure is sealed off at the ends of recess 114 of the feedback valve plate 72. Likewise the return recess 116 is connected with the motor recess 96 and correspondingly with the opposite motor recess 94, not illustrated, in FIG. 11. Under these conditions, the centering spring assemblies 50 of each of the servomotors 40 are free to hold the yoke 32 in its centered position.

Any angular movement imparted to the stem 71 of the input valve will establish connections to the one or the other of the servomotors 40, tending to push the yoke 32 into an angular position corresponding exactly to the angular position of stem 71. The other servomotor will remain connected with the return passage. When this position of the yoke 32 is reached, the feedback valve plate 72, due to its direct connection at 78 with the yoke 32, will have again restored the valves to a relative centered position such as shown in FIG. 11.

The direct association of the valves 70 and 72 upon the common axis with the yoke 32, and also the platelike form of the valves, produces a construction in which highly repeatable accuracy may be reliably obtained. At the same time, only a small additional bulk is added to the principal envelope of the pump or motor unit.

In many applications of hydrostatic transmissions, both the pump and the motor unit are required to be variable in displacement and heretofore rather complex linkages have been necessary in order to achieve proper control. For example, it may be desired to leave the motor unit on full stroke while the pump unit is varied from zero to full stroke and thereafter to cause the motor stroke to be reduced progressively to a minimum value. The present valve is designed to afford a simplified linkage by permitting the input member not only to move ahead of the feedback member any desired amount, but also to have a range of overtravel beyond the angular range of the feedback valve without any misfunction of the valving effect. FIGS. 12 and 13 illustrate such advanced positions of the input valve ahead of the position of the feedback valve.

Any advance position of input valve introduces, however, a shift in the effective location of balancing forces on the assembly. This is because connection of the pressure port with a motor port brings combined arcs of both ports, plus approximately half of their sealing land width, under the influence of supply pressure. Offset of balancing forces tends to tip the discs within their chamber increasing the force required to rotate the discs. This tipping tendency can be minimized on the input disc by adjusting the configuration of recesses in the valve plates in a manner such as illustrated in FIGS. 5 through 14. This result may be achieved by deliberately unbalancing the backface in relation to the valving face by differing radial dimensions as illustrated in FIG. 14. Also the porting is arranged on the valving faces so that the offset of forces is limited to a small amount on the input disc. Through small variations of this kind, the unbalance which is produced by advanced travel of the input valve ahead of the feedback valve, can be adjusted so as to minimize the unbalance on the input valve which, of course, may then be actuated by small forces, and allowing a greater unbalance to occur on the feedback valve which has the power of the servomotors 40 to drive it.

Referring to FIG. 12, the valve parts here illustrated are in the positions assumed where the angle of advance $\alpha$ is a small angle, say from one-half degree to 10°. Here, $La$ represents the arc of exposure of the backface of the input valve to supply pressure. The arcs $Lb$ and $Lc$ indicate the arc of exposure of the valving faces to supply pressure and the arc $Ld$ indicates the arc of exposure of the backface of the feedback valve to supply pressure. Force arrow $Fa$ indicates the angular position of the centroid of force acting on the backface of the input valve. Force $Fd$ indicates the corresponding angular position of the centroid of force acting on the backface of the feedback valve. Forces $Fc$ and $Fb$ indicate the equal and opposed forces tending to separate the valving faces.

The radial width of recesses 94 and 96 and the width of the adjacent sealing lands (see FIG. 14) may be so chosen as to tend to force the valving faces apart and press the backfaces of the respective valves against the housing. This unbalance may be kept small and it does not substantially interfere with the free movement of the input valve. For greater angles of advance such as are illustrated in FIG. 13, the centroids of the forces acting on the backfaces of the two valves considered as a unit, become significantly displaced due to the "stretch" of the arc over which supply pressure is effective on one-half of the valve. The disposition e.g., 5° apart) of the forces $Fa$ and $Fb$ is such as to create only a small tipping couple acting on the input valve while a larger couple e.g., $\alpha$—5° spacing) is applied to the feedback disc, as will be seen in FIG. 13.

In this way, the invention has provided a compact rotary plate type servo valve in which a substantial overtravel of the input member relative to the feedback member is not only available in all positions including the extreme angle of tilt of the yoke, but furthermore this has been achieved without incurring more than a small amount of hydraulically induced frictional drag on the input member itself. This allows both simplified control linkages for those transmission systems which use pumps and motors, both of which are variable, but it also allows actuation of the control with a minimum of force.

I claim:

1. A servo valve construction for a variable displacement fluid pressure energy translating device of the type having an oscillatable displacement-controlling member on a casing in which said member is journaled, the valve comprising a rotary input plate having a backface in sliding contact with the casing and a flow-regulating front face, a rotary feedback plate having a flow-regulating front face in sliding contact with the front face of the input plate and a backface in sliding contact with the casing, first ports in the casing providing for supply and exhaust of fluid respectively, second ports in the casing providing for reversible controlled flow, servomotor means connected to the latter pair of ports and mechanically connected to operate the oscillatable member, the two rotary plates and the oscillatable member being mounted for angular movement about a common axis with the feedback plate being directly connected with the oscillatable member.

2. A servo valve construction as defined in claim 1 wherein there is formed at the interface between the two plates an arcuate supply passage extending approximately 90°, a pair of controlled flow passages flanking the supply passage and each extending more than 90° and an exhaust passage of short arcuate extent diametrically opposite the supply passage, and means in the plates connecting the passages with both backfaces.

3. A servo valve construction as defined in claim 1 wherein the arcs subtended by some of the ports in the front faces extend beyond 90° to allow overtravel of the input plate relative to the feedback plate while maintaining the same flows established by initial travel of the input plate.

4. A servo valve construction for a variable displacement fluid pressure energy translating device of the type having a swashplate movable about an axis of oscillation, said valve comprising a pair of oscillatable members, one connected to move with the swashplate, and the other movable relative to the first for initiating movement of the swashplate, servomotor means controlled by the valve and effective to move the swashplate, said valve including flow-controlling surfaces on said members in contact with each other, and opposed balancing surfaces on said members for exposing the members to hydraulic pressure in opposing directions, the effective forces established by said balancing surfaces reacting unequally upon the two members when they are displaced, with the greater reaction taking place upon the said one member whereby the said other member may be operated without substantial hydraulic unbalance.

5. A servo valve construction as defined in claim 1 wherein the backfaces of the respective plates are provided with recessed areas of size and proportions to inadequately balance the separating forces acting between the plates.

6. A servo valve construction as defined in claim 5 wherein the feedback plate is more unbalanced than the input plate in positions of extreme displacement.

7. A servo valve construction as defined in claim 3 wherein the backfaces of the plates have hydraulic balancing recesses which are larger on the input plate than on the feedback plate.

8. A servo valve construction as defined in claim 1 wherein the backface of the input plate is provided with recessed areas of size and proportions to nearly balance the separating force acting between the plates and the backface of the feedback plate is provided with recessed areas of smaller effective area to inadequately balance the separating forces.

* * * * *